United States Patent
Kang et al.

(10) Patent No.: US 7,522,553 B2
(45) Date of Patent: Apr. 21, 2009

(54) SYSTEM AND METHOD FOR UPDATING A SLEEP ID OF A MOBILE STATION IN A BWA COMMUNICATION SYSTEM

(75) Inventors: Hyun-Jeong Kang, Seoul (KR); Chang-Hoi Koo, Seongnam-si (KR); Jung-Je Son, Seongnam-si (KR); Hyoung-Kyu Lim, Seoul (KR); Yeong-Moon Son, Anyang-si (KR); Sung-Jin Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 545 days.

(21) Appl. No.: 11/205,597

(22) Filed: Aug. 17, 2005

(65) Prior Publication Data

US 2006/0039320 A1      Feb. 23, 2006

(30) Foreign Application Priority Data

Aug. 17, 2004    (KR) ........................ 10-2004-0066576

(51) Int. Cl.
*H04Q 7/24*           (2006.01)
(52) U.S. Cl. ....................... 370/328; 455/574
(58) Field of Classification Search ............. None
See application file for complete search history.

(56) References Cited

U.S. PATENT DOCUMENTS

| | | | |
|---|---|---|---|
| 6,058,289 A | | 5/2000 | Gardner et al. |
| 6,222,251 B1* | | 4/2001 | Holloway ............... 257/607 |
| 6,539,230 B2 | | 3/2003 | Yen |
| 2005/0122936 A1* | | 6/2005 | Son et al. ............... 370/331 |
| 2005/0197171 A1* | | 9/2005 | Son et al. ............... 455/574 |
| 2006/0009267 A1* | | 1/2006 | Lee et al. ............... 455/574 |

FOREIGN PATENT DOCUMENTS

| | | |
|---|---|---|
| RU | 2 137 305 | 9/1999 |
| WO | WO 02/33989 | 4/2002 |

* cited by examiner

*Primary Examiner*—Erika A Gary
(74) *Attorney, Agent, or Firm*—The Farrell Law Firm, PC

(57) ABSTRACT

A system and method for updating a sleep identifier (SLPID) of a mobile station (MS) in a broadband wireless access (BWA) communication system having a sleep mode in which there is no transmission data and an awake mode in which there is transmission data. Upon recognizing a need to update an SLPID allocated to an MS in the sleep mode in the initial phase of the sleep mode, a base station (BS) reallocates a new SLPID to be allocated to the MS and transmits SLPID update information to the MS. Upon receiving the SLPID update information for its current SLPID during the sleep mode, the MS updates its current SLPID with the reallocated SLPID according to the received update information.

16 Claims, 9 Drawing Sheets

SYSTEM AND METHOD FOR UPDATING A SLEEP ID OF A MOBILE STATION IN A BWA COMMUNICATION SYSTEM

PRIORITY

This application claims the benefit under 35 U.S.C. §119 (a) of an application entitled "System and Method for Updating Sleep ID of Mobile Station in a BWA Communication System" filed in the Korean Intellectual Property Office on Aug. 17, 2004 and assigned Serial No. 2004-66576, the entire contents of which are incorporated herein by reference.

BACKGROUND OF THE INVENTION

1. Field of the Invention

The present invention relates generally to a Broadband Wireless Access (BWA) communication system, and in particular, to a method for updating information on a sleep identifier allocated to a mobile station, and a system using the same.

2. Description of the Related Art

Active research on the $4^{th}$ generation (4G) communication system, which is the next generation communication system, is being conducted to provide users with high-rate services supporting various Quality-of-Services (QoSs). Recently, many studies of the 4G communication system are being made to support a high-speed service capable of guaranteeing the mobility and the QoS in a BWA communication system such as a wireless Local Area Network (LAN) system and a wireless Metropolitan Area Network (MAN) system. The typical example BWA system is the Institute of Electrical and Electronics Engineers (IEEE) 802.16a communication system or the IEEE 802.16e communication system.

The IEEE 802.16a communication system and the IEEE 802.16e communication system utilize Orthogonal Frequency Division Multiplexing (OFDM) and Orthogonal Frequency Division Multiple Access (OFDMA) to support a broadband transmission network for a physical channel of the wireless MAN system. More specifically, the IEEE 802.16a communication system does not consider the mobility of subscriber stations (SSs), i.e., is directed to fixed MSs and a unicell structure. However, the IEEE 802.16e communication system considers the mobility of the SSs. Herein, an SS having the mobility will be referred to as a mobile station (MS).

The IEEE 802.16e communication system, as it considers the mobility of MSs, has a problem of high MS power consumption compared with other systems. As a typical method for minimizing the MS power consumption, a sleep mode and an awake mode between the MS and a base station (BS) have been proposed. In this case, the MS performs a ranging operation of periodically adjusting a timing offset, a frequency offset, and power with the BS in order to cope with a change in the quality of a channel to the BS. In particular, a periodic ranging operation is very important for the IEEE 802.16e communication system as it considers the mobility of MSs.

FIG. 1 is a diagram illustrating a sleep mode operation of a conventional IEEE 802.16e communication system. However, before a description of FIG. 1 is given, it should be noted that the sleep mode has been proposed to minimize MS power consumption in an idle interval for which no packet data is transmitted, during transmission of packet data. That is, in the sleep mode, an MS and a BS simultaneously transition to the sleep mode to minimize the MS power consumption in the idle interval in which no packet data is transmitted.

Generally, the interval for which no packet data is transmitted is equal in operation to the interval for which packet data is transmitted. Because such an operation is unreasonable, the sleep mode has been proposed. If there is packet data to transmit in the sleep mode, both the BS and the MS must simultaneously transition to the awake mode to transmit and receive packet data.

The sleep mode has been proposed to minimize the power consumption and inter-channel interference. However, because packet data is affected by traffic, the traffic characteristic and transmission type characteristic must be taken into consideration in the sleep mode operation.

Referring to FIG. 1, reference numeral 110 denotes a packet data generation format. The packet data generation format 110 includes a plurality of ON intervals and a plurality of OFF intervals. The ON intervals are burst intervals for which packet data, i.e., traffic, is generated, and the OFF intervals are idle intervals for which no traffic is generated. According to the traffic generation pattern, the MS and the BS alternately transition (mode change) to the sleep mode and the awake mode, thereby minimizing power consumption of the MS and canceling interference between channel signals.

Reference numeral 120 denotes a mode change format for the MS and the BS. The mode change format 120 for the MS and the BS includes a plurality of awake modes and a plurality of sleep modes. The awake modes represent the modes in which traffic is generated, and in the awake modes, actual transmission and reception of packet data is achieved. The sleep modes represent the modes in which no traffic is generated, and in the sleep modes, actual transmission and reception of the packet data is not achieved.

Reference numeral 130 denotes an MS power level format that represents a power level of the MS according to the packet data generation format 110 and the mode change format 120. In the MS power level format 130, an MS power level for the awake mode is represented by 'K', and an MS power level for the sleep mode is represented by 'M'. Comparing the MS power level K for the awake mode with the MS power level M for the sleep mode, the M is much less than the K. That is, in the sleep mode, because there is no packet data transmission/reception, the power consumption is insignificant.

A description will now be made herein below of the schemes currently proposed to support the sleep mode operation in the IEEE 802.16e communication system. However, before a description of the schemes currently proposed in the IEEE 802.16e communication system is given, the following preconditions will be described.

In order to transition to the sleep mode, the MS must receive a mode change approval from the BS. The BS transmits an approval for transition to the sleep mode to the MS and then transmits packet data. The BS must transmit information indicating the presence of transmission packet data to the MS, during a listening interval of the MS. In this case, the MS must awake from the sleep mode and determine if there is packet data to be transmitted thereto from the BS.

If it is determined that there is packet data to be transmitted thereto from the BS, the MS transitions to the awake mode and receives packet data form the BS. However, if it is determined that there is no packet data to be transmitted thereto from the BS, the MS can either return to the sleep mode or maintain the awake mode.

Parameters for Supporting Sleep Mode and Awake Mode Operations

A description will now be made of the parameters required to support the sleep mode and awake mode operations currently proposed in the IEEE 802.16e communication system.

(1) Sleep Identifier (SLPID)

The SLPID is a value that an MS is allocated through a Sleep-Response (SLP-RSP) message for transitioning from the awake mode to the sleep mode, and is uniquely allocated only to the MSs in the sleep mode. That is, the SLPID is an ID used for identifying an MS in the sleep mode including the listening interval, and if the corresponding MS makes a mode change from the sleep mode to the awake mode, the SLPID previously allocated to the MS is returned to the BS so that another MS wanting to transition to the sleep mode can reuse the SLPID through the SLP-RSP message. Commonly, the SLPID has a 10-bit size, and thus can be used for identifying a total of 1024 MSs in sleep mode operation.

(2) Sleep Interval

The sleep interval is an interval that a BS allocates to an MS at the request of the MS, and represents the time interval for which the MS maintains the sleep mode until a listening interval starts after the MS makes a mode change from the awake mode to the sleep mode. That is, the sleep interval is defined as the total time interval for which the MS is in the sleep mode.

The MS can continuously maintain the sleep mode if there is no data transmitted from the BS even after the sleep interval. In this case, the MS updates the sleep interval while increasing the sleep interval using predetermined initial-sleep window and final-sleep window values. The initial-sleep window value represents an initial minimum value of the sleep interval, and the final-sleep window value represents a final maximum value of the sleep interval. The initial-sleep window value and the final-sleep window value can be represented by the number of frames.

The listening interval is an interval that a BS allocates to an MS at the request of the MS. The listening interval corresponds to the time interval for which the MS temporarily awakes to receive downlink messages such as a traffic indication (TRF-IND) message from the BS during the sleep mode operation, and in the listening interval, the MS can receive the downlink messages in synchronism with a downlink signal from the BS. The TRF-IND message indicates if there is traffic to be transmitted to the MS, i.e., indicates if there is packet data.

The MS continuously waits for the reception of the TRF-IND message for the listening interval. If a bit indicating the MS in an SLPID bitmap included in the TRF-IND message represents a positive indication value, the MS continuously maintains the awake mode, thereby transitioning to the awake mode. However, if the bit indicating the MS in the SLPID bitmap included in the TRF-IND message represents a negative indication value, the MS transitions back to the sleep mode.

(3) Sleep Interval Update Algorithm

Upon transitioning to the sleep mode, the MS determines a sleep interval, regarding the minimum window value as the minimum sleep mode interval. Thereafter, if the MS wakes up from the sleep mode for the listening interval and determines that there is no packet data to be transmitted from the BS, the MS sets the sleep interval to an interval that is 2 times the previous sleep interval, and continuously maintains the sleep mode. For example, if the minimum window value is '2', the MS sets the sleep interval to an interval of 2 frames, and then maintains the sleep mode for the 2 frames. After a lapse of the 2 frames, the MS awakes from the sleep mode for the listening interval, and determines if a TRF-IND message is received. If the TRF-IND message is not received, i.e., if there is no packet data to be transmitted thereto from the BS, the MS sets the sleep interval to a 4-frame interval, which is 2 times the 2-frame interval, and then maintains the sleep mode for the 4 frames. Accordingly, the sleep interval can increase between the minimum window value and the maximum window value.

Messages for Supporting Sleep Mode and Awake Mode Operation

A description will now be made of the messages currently defined to support the sleep mode and awake mode operations in the IEEE 802.16e communication system.

(1) Sleep-Request (SLP-REQ) Message

The SLP-REQ message, a message transmitted from an MS to a BS, is used when the MS requests a mode change to the sleep mode. The SLP-REQ message includes the parameters, or information elements (IEs), required by the MS to operate in the sleep mode. A format of the SLP-REQ message is shown below in Table 1.

TABLE 1

| Syntax | Size | Notes |
|---|---|---|
| SLP-REQ_Message_Format( ) { | | |
| Management message type = 50 | 8 bits | |
| Initial-sleep window | 6 bits | |
| Final-sleep window | 10 bits | |
| Listening interval | 6 bits | |
| Reserved | 2 bits | |
| } | | |

The SLP-REQ message is a dedicated message transmitted on the basis of a connection ID (CID) of an MS, and IEs of the SLP-REQ message include a Management Message Type, an Initial-Sleep Window, a Final-Sleep Window, and a Listening Interval. The Management Message Type indicates a type of the current transmission message, and Management Message Type=50 indicates the SLP-REQ message. The Initial-Sleep Window indicates a requested start value for the sleep interval (measured in frames), and the Final-Sleep Window indicates a requested stop value for the sleep interval (measured in frames). That is, as described with reference to the sleep interval update algorithm, the sleep interval can be updated between the initial-window value and the final-window value. The Listening Interval indicates a requested listening interval (measured in frames), and the listening interval can also be represented by the number of frames.

(2) Sleep-Response (SLP-RSP) Message

The SLP-RSP message, a response message to the SLP-REQ message, can be used to approve or deny a mode change to the sleep mode requested by the MS, or can be used to indicate an unsolicited instruction. The SLP-RSP message includes IEs needed by the MS to operate in the sleep mode, and a format of the SLP-RSP message is shown in Table 2.

TABLE 2

| Syntax | Size | Notes |
|---|---|---|
| MOB-SLP-RSP_Message_Format( ) { | | |
| Management message type = 51 | 8 bits | |
| Sleep-approved | 1 bit | 0: Sleep-mode request denied<br>1: Sleep-mode request approved |
| If (Sleep-approved == 0) { | 1 bit | 0: The MS may retransmit the MOB_SLPREQ message after the time duration (REQ-duration) given by the BS in this message |

TABLE 2-continued

| Syntax | Size | Notes |
|---|---|---|
| | | 1: The MS shall not retransmit the MOB_SLPREQ message and shall await the MOB_SLPRSP message from the BS |
| REQ-duration | 4 bits | Time duration for case where After-REQ-action value is 0 |
| reserved | 2 bits | |
| } | | |
| else { | | |
|   Start frame | | |
|   initial-sleep windows | 6 bits | |
|   final-sleep windows | 10 bits | |
|   listening interval | 6 bits | |
|   SLPID | 10 bits | |
| } | | |
| } | | |

The SLP-RSP message is also a dedicated message transmitted on the basis of a Basic CID of an MS, and IEs of the SLP-RSP message illustrated in Table 2 will be described below.

Management Message Type indicates a type of the current transmission message, and Management Message Type=51 indicates the SLP-RSP message. Sleep-Approved is expressed with 1 bit, wherein Sleep-Approved=0 indicates sleep-mode request denied and Sleep-Approved=1 indicates sleep-mode request approved. More specifically, Sleep-Approved=0 indicates that a mode change to the sleep mode requested by the MS is denied by the BS. Upon receiving the denial, the MS transmits the SLP-REQ message to the BS according to conditions, or waits for the reception of the SLP-RSP message indicating unsolicited instruction from the BS.

For Sleep-Approved=1, the SLP-RSP message includes Start Frame, Initial-Sleep Window, Final-Sleep Window, Listening Interval, and SLPID. For Sleep-Approved=0, the SLP-RSP message includes After-REQ-Action and REQ-Duration. The Start Frame value indicates a frame value up to the time when the MS enters the first sleep interval, and does not include the frame where the SLP-RSP message is received (the number of frames (not including the frame in which the message has been received) until the MS shall enter the first sleep interval). That is, the MS transitions to the sleep mode after a lapse of frames corresponding to the start frame value from the next frame after the frame over which the SLP-RSP message has been received. The SLPID is used for identifying MSs in the sleep mode, and can be used for identifying a total of 1024 MSs in the sleep mode.

As described above, the Initial-Sleep Window value indicates a start value for the sleep interval (measured in frames), and the listening interval value indicates a value for the listening interval (measured in frames). The Final-Sleep Window value indicates a stop value for the sleep interval (measured in frames). The After-REQ-action value indicates an operation that the MS, whose request to the sleep mode has been denied, must perform.

(3) Traffic Indication (TRF-IND) Message

The TRF-IND message, a message transmitted from a BS to an MS for the listening interval, indicates the presence of packet data to be transmitted from the BS to the MS. A format of the TRF-IND message is shown below in Table 3.

TABLE 3

| Syntax | Size | Notes |
|---|---|---|
| MOB-TRF-IND_Message_Format( ){ | | |
|   Management Message Type = 52 | 8 bits | |
|   FMT | 1 bit | 0= SLPID based format<br>1 = CID based format |
|   if(FMT==0){ | | |
|     Byte of SLPID bitmap | 8 bits | |
|     SLPID bitmap | Variable | |
|   } else { | | |
|     Num-pos | 7 bits | Number of CIDs on the positive indication list |
|     for(i=0 ; i<Num-pos ; i++){ | | |
|       Short Basic CID | 12 bit | Basic CID |
|     } | | |
|     while (!byte_boundary){ | | |
|       Padding bits | 1 | padding for byte alignment |
|     } | | |
|   } | | |
| } | | |

The TRF-IND message is a broadcasting message that is transmitted on a broadcasting basis, unlike the SLP-REQ message and the SLP-RSP message. The TRF-IND message indicates the presence/absence of packet data to be transmitted from the BS to a particular MS, and the MS encodes the broadcasted TRF-IND message for the listening interval, and determines whether to transition to the awake mode, or to transition back to the sleep mode, according to the decoding result.

When determining to transition to the awake mode, the MS detects frame synchronization, and if a corresponding frame sequence number is not identical to a frame sequence number expected by the MS, the MS can request retransmission of the packet data lost in the awake mode. Otherwise, if the MS fails to receive the TRF-IND message for the listening interval, or if a value indicating positive indication is not included in the TRF-IND message even though the TRF-IND message is received, the MS may return to the sleep mode.

For the IEs in the TRF-IND message, Management Message Type indicates a type of the current transmission message, and Management Message Type=52 indicates the TRF-IND message. FMT indicates whether to use an SLPID or a Basic CID of an MS in the process of indicating the presence/absence of the traffic to be transmitted to the MS in the sleep mode. When the SLPID is used for the indication, the SLPID bitmap indicates a set of indication indexes allocated bit by bit to each of the SLPIDs allocated to MSs to identify the MSs that has transitioned to the sleep mode. That is, the SLPID bitmap indicates a group of bits allocated bit by bit to each MS, for (maximum value−1) SLPIDs among the SLPIDs allocated to the MS in the sleep mode. The SLPID bitmap may be allocated dummy bits through byte alignment.

One bit allocated to the MS indicates the presence/absence of data to be transmitted from the BS to the corresponding MS. Therefore, an MS in the sleep mode reads a bit mapped to an SLPID that was allocated during a mode change to the sleep mode from the TRF-IND message received for the listening interval, and if the read bit indicates a positive indication value, i.e., a value of '1', the MS continuously maintains the awake mode, thereby transitioning to the awake mode. Otherwise, if the allocated bit indicates a negative value, i.e., a value of '0', the MS transitions back to the sleep mode.

The BS sequentially allocates SLPIDs to MSs entering the sleep mode in the order of an SLPID with the smaller number among unallocated SLPIDs. During the sleep mode, the MS continuously uses the fixed SLPID allocated from the BS in the initial phase of the sleep mode until it returns to the awake mode.

In this case, each MS that has entered the sleep mode must read the SLPID bitmap from its beginning until a corresponding part where its own SLPID is located, in order to determine the present/absence of packet data transmitted thereto. Because the SLPID that the MS is allocated is fixed to the initially allocated number, if there are many unallocated empty SLPIDs in the SLPID bitmap, there is a considerable waste of resources and time required for reading SLPIDs. That is, increasing the number of MSs entering the sleep mode increases SLPID numbers allocated to the MSs. Therefore, an MS with a greater SLPID number, as its allocated SLPID number is fixed, has a long processing time for reading and processing the SLPID bitmap up to its traffic SLPID. In addition, though the number of MSs that have actually entered the sleep mode is not large, if a difference between the least SLPID and the greatest SLPID among the SLPIDs allocated to the MSs is great, the SLPID bitmap excessively increases.

SUMMARY OF THE INVENTION

Accordingly, the present invention has been designed to solve the above and other problems occurring in the prior art.

It is, therefore, an object of the present invention to provide a method for updating a sleep identifier (SLPID) allocated to a mobile station (MS) in a sleep mode in a Broadband Wireless Access (BWA) communication system, and a system using the same.

It is another object of the present invention to provide a method and system for reducing a processing time for reading and processing an SLPID by an MS through SLPID updating, such that the SLPID bitmap is not unnecessarily increased and effectively managed.

It is further another object of the present invention to provide a method and system for periodically updating and managing, by an MS, an SLPID allocated from a base station (BS) during transition to a sleep mode in a BWA communication system.

According to one aspect of the present invention, there is provided a method for updating a sleep identifier (SLPID) of a mobile station (MS) in a broadband wireless access (BWA) communication system having a sleep mode in which there is no transmission data and an awake mode in which there is transmission data, the sleep mode having a sleep interval for which data reception is impossible and a listening interval for which data reception is possible. The method includes the steps of: recognizing a need to update an SLPID allocated to an MS in the sleep mode in the initial phase of the sleep mode; reallocating, by a base station (BS), a new SLPID to be allocated to the MS; transmitting the SLPID to the MS; receiving update information for its current SLPID during the sleep mode; and updating, by the MS, its current SLPID with the reallocated SLPID according to the received update information.

According to another aspect of the present invention, there is provided a method for updating, by a base station (BS), a sleep identifier (SLPID) allocated to a mobile station (MS) in a broadband wireless access (BWA) communication system having a sleep mode in which there is no transmission data and an awake mode in which there is transmission data, the sleep mode having a listening interval for which data reception is possible. The method includes the steps of: determining if there is a need to update an SLPID of an MS in the sleep mode; determining an SLPID allocable to the MS if there is a need to update the SLPID of the MS; creating SLPID update information including the determined SLPID if an SLPID to be newly allocated to the MS is determined; and transmitting the SLPID update information to the MS.

According to further another aspect of the present invention, there is provided a method for updating a sleep identifier (SLPID) by a mobile station (MS) in a broadband wireless access (BWA) communication system having a sleep mode in which there is no transmission data and an awake mode in which there is transmission data, the sleep mode having a sleep interval for which data reception is impossible and a listening interval for which data reception is possible. The method includes the steps of: receiving a predetermined indication message including an SLPID update indicator; checking SLPID update information included in the received indication message; and if an SLPID update indicator and a new SLPID are allocated in the update information, updating a current SLPID with the new SLPID.

According to yet another aspect of the present invention, there is provided a system for updating a sleep identifier (SLPID) of a mobile station (MS) in a broadband wireless access (BWA) communication system having a sleep mode in which there is no transmission data and an awake mode in which there is transmission data, the sleep mode having a sleep interval for which data reception is impossible and a listening interval for which data reception is possible. The system includes: an MS; and a base station (BS) for, upon recognizing a need to update an SLPID allocated to the MS in the sleep mode in the initial phase of the sleep mode, reallocating a new SLPID to be allocated to a corresponding MS and transmitting the SLPID to the corresponding MS. The MS, upon receiving SLPID update information from the BS during the sleep mode, updates its current SLPID with the reallocated SLPID according to the received update information.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF EXEMPLARY EMBODIMENTS

Figure 1:
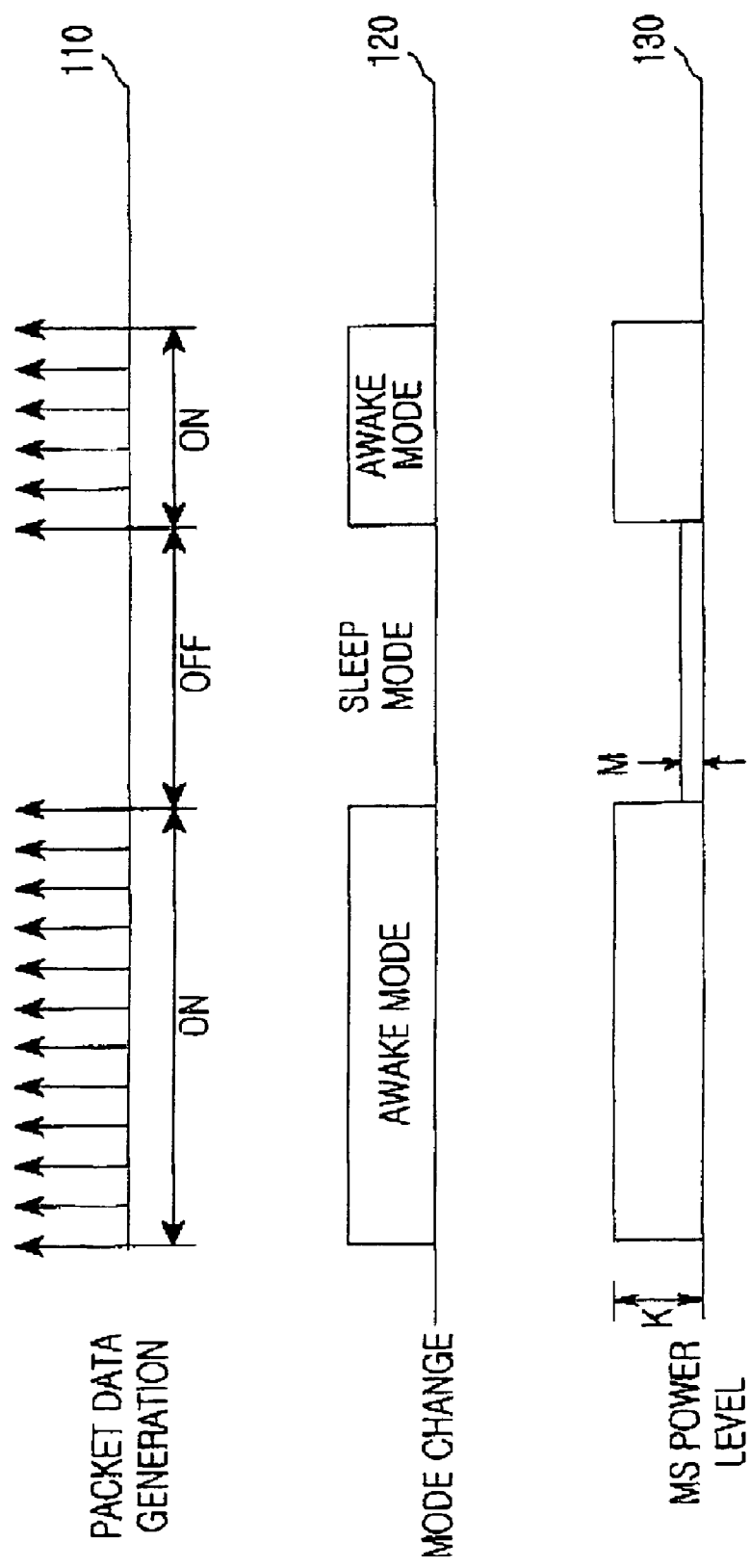
FIG. 1 is a diagram illustrating a sleep mode operation of a conventional IEEE 802.16e communication system.

Several exemplary embodiments of the present invention will now be described in detail with reference to the annexed drawings. In the following description, a detailed description of known functions and configurations incorporated herein has been omitted for conciseness.

The present invention proposes a sleep identifier (SLPID) updating scheme for a mobile station (MS) in a sleep mode in an Institute of Electrical and Electronics Engineers (IEEE) 802.16e communication system, which is a Broadband Wireless Access (BWA) communication system. "SLPID updating" refers to a process in which a base station (BS) reallocates a new SLPID to an MS in the sleep mode during the sleep mode operation, instead of the SLPID allocated in the initial phase of the sleep mode process. Accordingly, the present invention can efficiently manage SLPID resources through the SLPID updating.

Although the present invention, by way of example, will be described herein with reference to the IEEE 802.16e communication system, the present invention can also be applied to all other communication systems supporting the sleep mode operation and periodic ranging in the sleep mode operation.

First Embodiment

In an SLPID update method according to a first embodiment of the present invention, a BS updates an SLPID in a periodic ranging operation with an MS in a sleep mode. However, before a description of a periodic ranging-based SLPID update method according to the first embodiment of the present invention is given, a brief description will now be made of the ranging.

The ranging is classified into initial ranging, periodic ranging, and bandwidth request ranging. Before transmitting data through the ranging operation, an MS can correct transmission power and correct a timing offset and a frequency offset.

The initial ranging is ranging performed by a BS to acquire synchronization with an MS, and the initial ranging is performed to detect a correct timing offset between the MS and the BS and to correct transmission power. That is, upon power-on, the MS performs the initial ranging to acquire synchronization with the BS by receiving a DL-MAP message and a UL-MAP message and to correct the timing offset and the transmission power with the BS.

The periodic ranging represents ranging periodically performed by the MS to correct channel conditions with the BS after correcting the timing offset and transmission power with the BS through the initial ranging, and the bandwidth request ranging is ranging in which the MS requests allocation of a bandwidth to perform actual communication with the BS after correcting the timing offset and transmission power with the BS through the initial ranging.

As described above, because the IEEE 802.16e communication system considers the mobility of MSs, the periodic ranging for the MSs is very important for reliable data transmission/reception. The periodic ranging is an operation for measuring and correcting the parameters required for enabling the MS to communicate with a BS. The BS must allocate uplink resources such that the MS can perform periodic ranging, i.e., the MS can transmit a ranging request (RNG-REQ) message to the BS. That is, the BS must allocate uplink resources to the MS for periodic ranging of the MS, and must transmit the uplink resource allocation information to the MS through a UL-MAP message.

The MS transmits the RNG-REQ message to the BS through the uplink resource allocated from the BS, thereby performing periodic ranging with the BS. The BS corrects the transmission power, timing offset, and frequency offset according to the RNG-REQ message received from the MS, and then transmits a ranging response (RNG-RSP) message to the MS in response to the RNG-REQ message, ending the periodic ranging. Even the MS in the sleep mode must perform the periodic ranging to reliably communicate with the BS.

Figure 2:
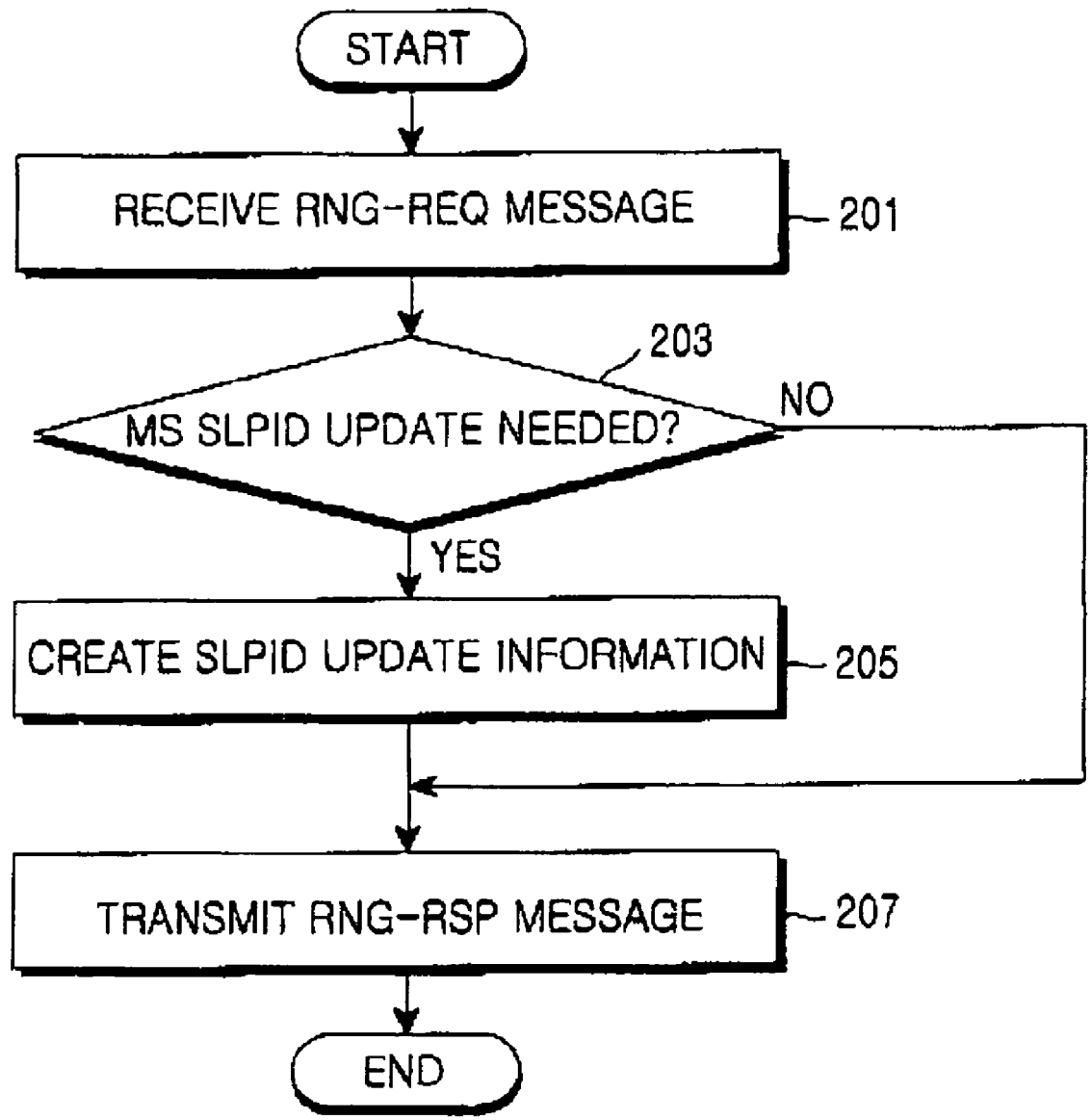
FIG. 2 is a flowchart illustrating an SLPID update process by a BS in a communication system according to an embodiment of the present invention.

FIG. 2 is a flowchart illustrating an SLPID update process performed in a BS in a periodic ranging operation with an MS in a sleep mode in a communication system according to an embodiment of the present invention. Referring to FIG. 2, in step 201, a BS receives an RNG-REQ message for periodic ranging from an MS in a sleep mode. In step 203, the BS determines if there is a need to update an SLPID of the MS in the sleep mode. More specifically, in step 203, the BS determines if there is an empty SLPID in a list of SLPIDs with a number less than that of the current SLPID of the corresponding MS in the total SLPID list managed in the BS. The empty SLPID can correspond to an SLPID returned to the BS when another MS using the SLPID previously allocated from the BS transitions to the awake mode. If there are a plurality of empty SLPIDs, it is preferable to newly allocate and update the least SLPID among the empty SLPIDs. In this manner, an SLPID of the MS can be continuously updated with a smaller SLPID rather than being fixed to the initially allocated SLPID.

For example, assuming that the lowest SLPID that the BS can allocate to the MS in the sleep mode is an SLPID#1 and an SLPID initially allocated to the MS is an SLPID#99, if there are unused SLPIDs between the SLPID#1 and the current SLPID#99 for the MS that has transmitted the RNG-REQ message, the BS can newly allocate the least one of the empty SLPIDs to the MS.

If it is determined in step 203 that there is a need to update the SLPID of the MS, i.e., if the BS determines the presence of unused SLPIDs between the least SLPID allocable to the MS in the sleep mode and the SLPID of the MS, the BS creates an RNG-RSP message including information used for updating the SLPID of the MS in the sleep mode in step 205. That is, the BS creates an SLPID currently used by the MS and SLPID information to be newly allocated to the MS in an SLPID_Update field of the RNG-RSP message, which is a response message to the RNG-REQ message, and stores the RNG-RSP message. Preferably, the BS creates the current SLPID used by the MS and the SLPID information to be newly allocated to the MS in pair.

Thereafter, in step 207, the BS transmits the RNG-RSP message including the created SLPID information to the MS. However, if it is determined in step 203 that there is no need to update the SLPID of the MS, the BS transmits an RNG-RSP message with no SLPID_Update value to the MS in step 207.

The SLPID_Update parameter added to a Type/Length/Value (TLV) Encoding parameter of the RNG-RSP message is shown below in Table 4.

TABLE 4

| Name | Type | Length | Value |
| --- | --- | --- | --- |
| SLPID_Update | 18 | variable | compound |
| Name | Type (1byte) | Length | Value (Variable length) |
| Old_New_SLPID | 18.1 | 20 bits | The first 10 bits indicate old SLPID and the last 10 bits indicate new SLPID |

Referring to Table 4, the SLPID_Update parameter includes Old_New_SLPID in which an OLD SLPID currently allocated to the MS and a NEW SLPID to be newly allocated to the MS are stored in pair.

As shown in Table 4, the SLPID_Update parameter, as it is a TLV Encoding type parameter, is transmitted to the MS through the RNG-RSP message only when necessary. That is, the BS transmits the SLPID_Update parameter to the MS through the RNG-RSP message at the time where the periodic ranging is completed, only when it detects the need to update the SLPID of the MS.

Figure 3:
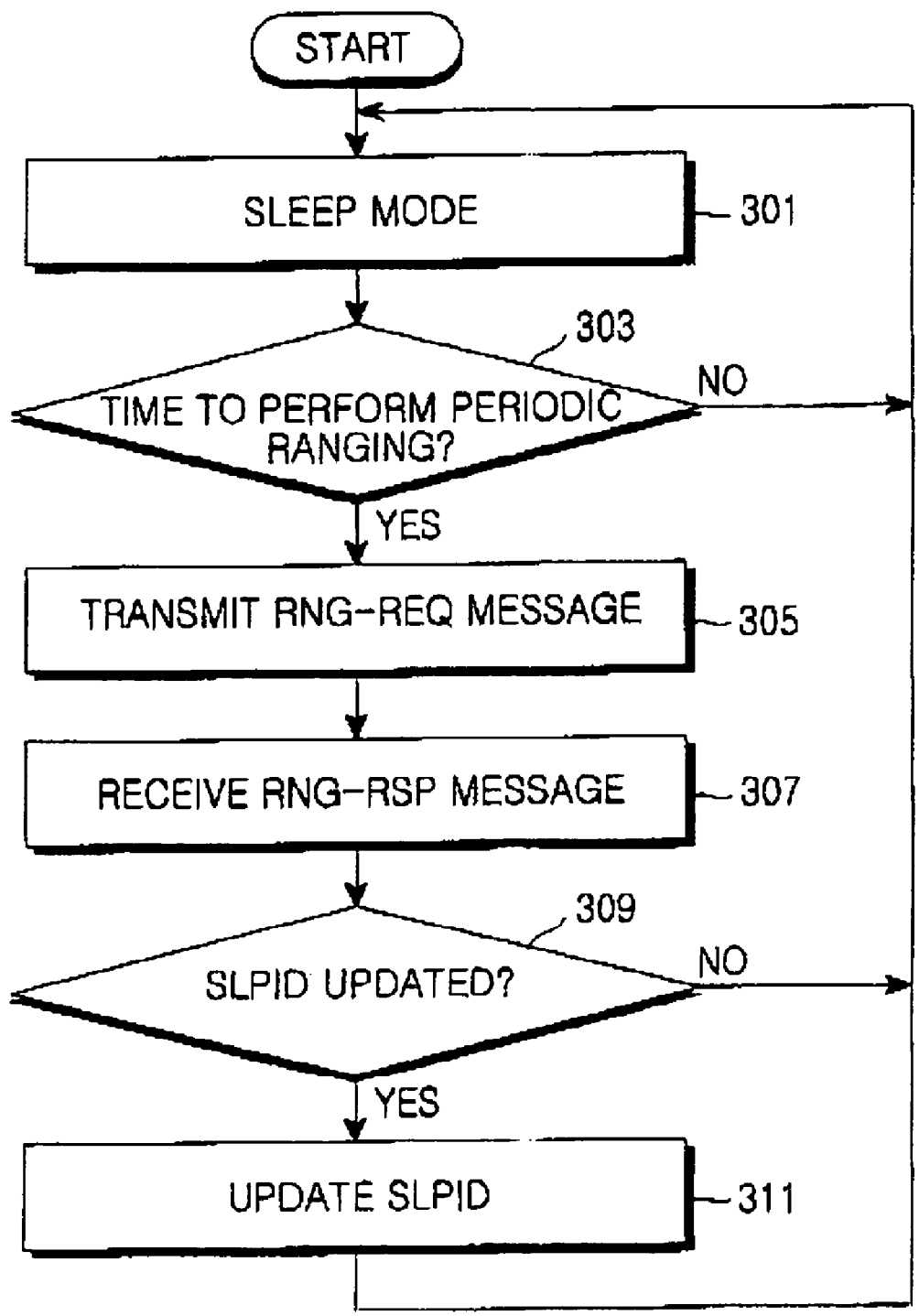
FIG. 3 is a flowchart illustrating an SLPID update process by an MS in a communication system according to an embodiment of the present invention.

FIG. 3 is a flowchart illustrating an SLPID update process performed in an MS in a periodic ranging operation between a BS and the MS in the sleep mode in a communication system according to an embodiment of the present invention. Referring to FIG. 3, an MS stays in a sleep mode in step 301. That is, the MS stays in the state where it is allocated an initial SLPID from the BS and transmits no data in the sleep mode. In step 303, the MS determines if it is time to perform a periodic ranging process with the BS. If it is not time to perform the periodic ranging process, the MS continuously maintains the sleep mode. However, if it is time to perform the periodic ranging process, the MS transmits an RNG-REQ message to the BS for ranging request in step 305. Subsequently, in step 307, the MS receives an RNG-RSP message from the BS in response to the ranging request.

In step 309, the MS determines if there is an SLPID_Update parameter included in the RNG-RSP message received from the BS to determine whether its own SLPID is updated. If there is an SLPID_Update parameter included in the RNG-RSP message received from the BS, the MS updates its own SLPID with the SLPID newly allocated by the BS according to the parameter information in step 311, and then returns to step 301, transitioning back to the sleep mode. However, if it is determined in step 309 that if there is no SLPID_Update parameter included in the RN-RSP message received from the BS, the MS maintains the old SLPID currently allocated thereto and returns to step 301 to transition back to the sleep mode. The sleep mode in step 301 has a concept including one or both the sleep interval or the listening interval.

Second Embodiment

The SLPID update method according to the second embodiment of the present invention is characterized by updating an SLPID using a TRF-IND message in a listening interval of the sleep mode. The SLPID update method using the TRF-IND message according to the second embodiment of the present invention will now be described with reference to FIGS. 4, 5A and 5B.

Figure 4:
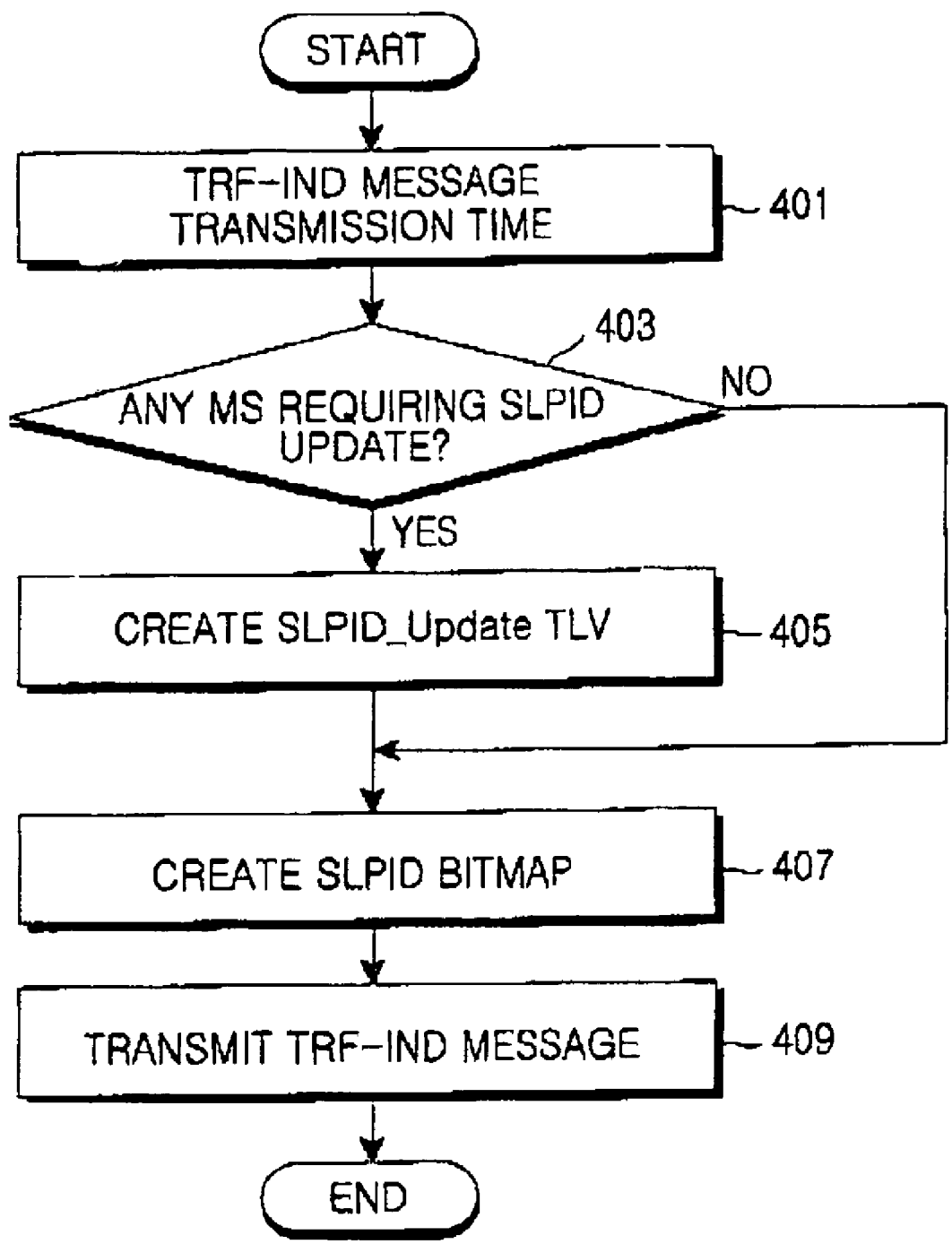
FIG. 4 is a flowchart illustrating an SLPID update process by a BS using a TRF-IND message in a communication system according to an embodiment of the present invention.

FIG. 4 is a flowchart illustrating a BS operation of updating an SLPID of an MS through a TRF-IND message in a communication system according to an embodiment of the present invention. Referring to FIG. 4, at step 401, a transmission time of a TRF-IND message occurs. In step 403, a BS determines if there is an MS requiring an SLPID update, for at least one MS not required to transition to the awake mode among the MSs in the listening interval of the sleep mode. That is, the BS determines if there is a need to update an SLPID for an MS that will continuously maintain the sleep mode. The process of determining if there is a need to update an SLPID is achieved by determining if there is any empty SLPID in a list of SLPIDs with a number less than that of the current SLPID of the MS in the total SLPID list managed in the BS. The empty SLPID can correspond to an SLPID returned to the BS when another MS using the SLPID previously allocated from the BS makes a mode change to the awake mode. If there are a plurality of newly allocable empty SLPIDs, it is preferable to newly allocate and update the least SLPID among the empty SLPIDs. In this manner, an SLPID of the MS can be continuously updated with a smaller SLPID rather than being fixed to the initially allocated SLPID.

For example, assuming that the lowest SLPID that the BS can allocate to the MS in the sleep mode is an SLPID#1 and an SLPID initially allocated to the MS is an SLPID#99, if there are unused SLPIDs between the SLPID#1 and the current SLPID#99 for the MS that has transmitted the RNG-REQ message, the BS can newly allocate the least one of the empty SLPIDs to the MS.

If it is determined in step 403 that there is an MS requiring SLPID update, i.e., if the BS determines that there is an MS requiring SLPID update while maintaining the sleep state for at least one MS in the listening interval, the BS creates a TRF-IND message including information on a new SLPID to be allocated to the MS requiring SLPID update, i.e., information used for updating the SLPID of the MS in step 405. More specifically, the BS creates the TRF-IND message by adding information on the SLPID currently used for the MS and information on the SLPID to be newly allocated to the MS to an SLPID_Update field of the TRF-IND message.

In step 407, the BS creates an SLPID bitmap of the TRF-IND message by setting a traffic indicator of the TRF-IND message for the MS requiring SLPID update to a negative indicator (bit=0) and setting an SLPID update indicator to a positive indicator (bit=1).

If it is determined in step 403 that there is no MS requiring SLPID update, in step 407, the BS creates the SLPID bitmap of the TRF-IND message by setting the traffic indicator to 0 (negative indicator) and the SLPID update indicator to 0 (negative indicator) for the MS that has no data traffic to transmit and does not require SLPID update. Although the SLPID update is not required for the MSs, if there is data traffic to transmit, the BS creates the SLPID bitmap of the TRF-IND message by setting the traffic indicator to 1 (positive indicator) for the corresponding MS.

After creating the SLPID bitmap, the BS broadcasts the TRF-IND message including the SLPID bitmap in step 409.

A format of the modified TRF-IND message broadcasted by the BS in step 409 is shown below in Table 5.

TABLE 5

| Syntax | Size | Notes |
| --- | --- | --- |
| MOB-TRF-IND_Message_Format( ){ | | |
| Management Message Type = 52 | 8 bits | |
| FMT | 1bit | 0= SLPID based format |
| | | 1 = CID based format |

TABLE 5-continued

| Syntax | Size | Notes |
|---|---|---|
| if(FMT==0){ | | |
|   Byte of SLPID bitmap | 8 bits | |
|   SLPID bitmap | Variable | Two bits are allocated to one MS. |
| | | 00: negative traffic indicator/negative SLPID update |
| | | 01: negative traffic indicator/positive SLPID update |
| | | 10: positive traffic indicator |
| | | 11: reserved |
| } else { | | |
|   Num-pos | 7 bits | Number of CIDs on the positive indication list |
|   for(i=0 ; i<Num-pos ; i++){ | | |
|     Short Basic CID | 12 bit | Basic CID |
|   } | | |
|   while (!byte_boundary){ | | |
|     Padding bits | 1 bit | padding for byte alignment |
|   } | | |
| } | | |
| } | | |

As shown in Table 5, the SLPID bitmap information of the TRF-IND message includes bit information indicating the presence/absence of data traffic to be transmitted to the MS and bit information indicating whether to update the SLPID allocated to the MS. Of the two bits of the SLPID bitmap, the first bit is a traffic indicator indicating the presence/absence of traffic, and the second bit is an SLPID update indicator indicating the presence/absence of SLPID update. For example, if SLPID bitmap information for the MS is '00', it indicates that there is no data traffic to be transmitted to the MS and there is no need to update an SLPID of the MS. If SLPID bitmap information for the MS is '01', it indicates that there is no data traffic to be transmitted to the MS and there is a need to update an SLPID of the MS. Therefore, the MS must read SLPID_Update information included in TLV of the TEF-IND message and detect an SLPID newly allocated thereto. If SLPID bitmap information for the MS is '10', it indicates that there is data traffic to be transmitted to the MS. Therefore, the MS indicates the necessity to make a mode change to the awake mode. In addition, because the SLPID update process is not necessary for an MS having transmission data traffic, if the first one bit of the SLPID bitmap is set to 1, the MS must transition to the awake mode, regardless of a value of the last one bit.

Although the TRF-IND message according to the present invention has shown and described with reference to an embodiment thereof, it is not limited to the foregoing description. For example, according to another embodiment of the present invention, the TRF-IND message can be created with 1 bit. In this case, the TRF-IND message indicates only the presence/absence of data traffic to be transmitted to the MS. If there is no data traffic, the MS reads an SLPID_Update TLV included in the received TRF-IND message, and determines whether there is SLPID information corresponding thereto, performing SLPID update.

When an SLPID update indicator of the TRF-IND message is set to a positive indicator, an SLPID_Update parameter is added to the TLV Encoding parameter of the TRF-IND message as is shown below in Table 6.

TABLE 6

| Name | Length | Value |
|---|---|---|
| SLPID_Update | variable | Compound |

| Name | Length | Value (Variable length) |
|---|---|---|
| For (i=0; i<N_SLPID_update; i++) { | | |
|   Old_New_SLPID | 20 bits | The first 10 bits indicate old SLPID and the last 10 bits indicate new SLPID |
| } | | |

Referring to Table 6, the SLPID_Update parameter includes Old_New_SLPID in which an OLD SLPID currently allocated to the MS and a NEW SLPID to be newly allocated to the MS are stored in pair. Because the TRF-IND message including the SLPID_Update parameter is transmitted on a broadcast basis, the TRF-IND message can include as many SLPIDs currently used by the MS and SLPIDs to be newly allocated to the MS as the number of MSs requiring SLPID update.

Figure 5A:
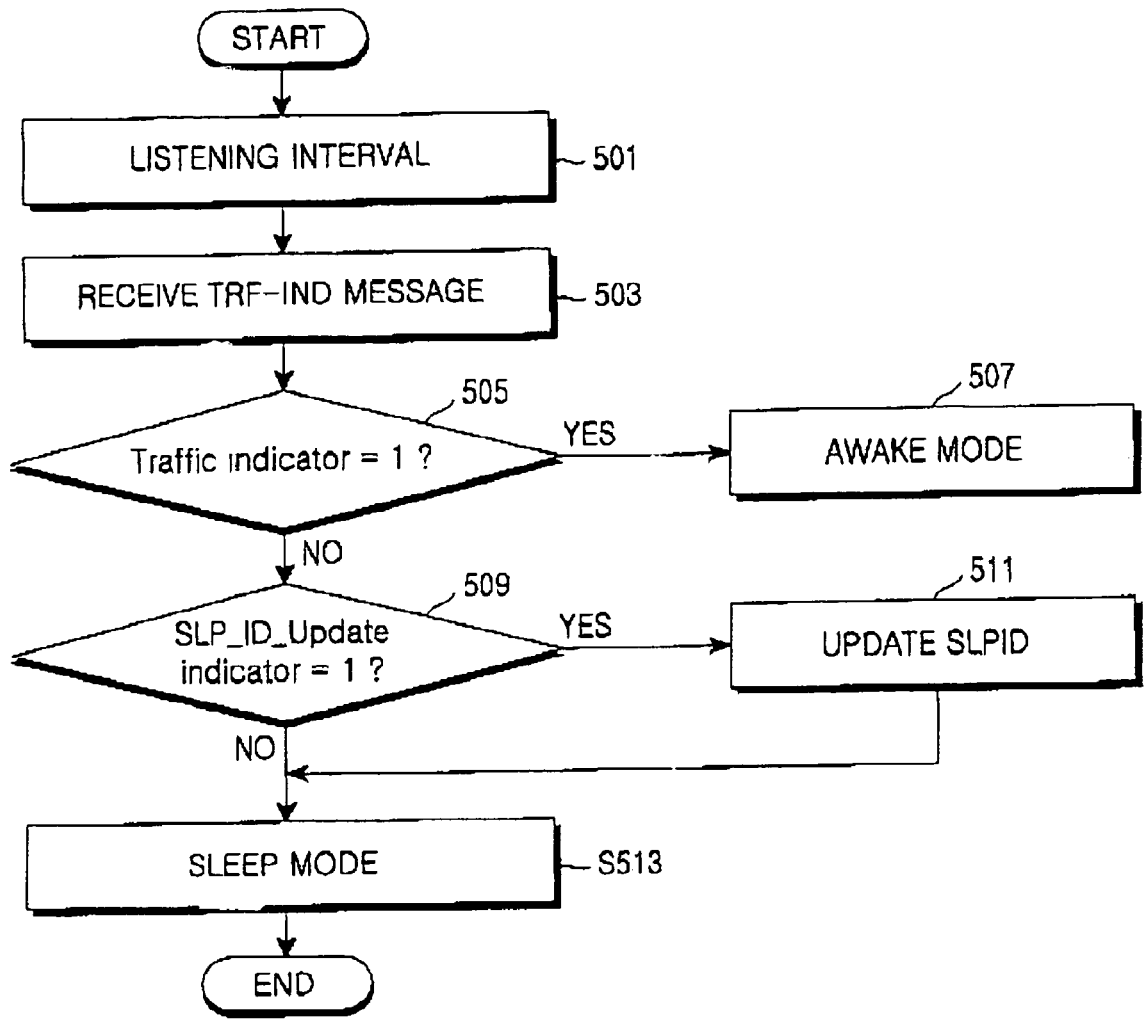
FIGS. 5A and 5B are flowcharts illustrating an SLPID update process by an MS using a TRF-IND message in a communication system according to an embodiment of the present invention.
Figure 5B:
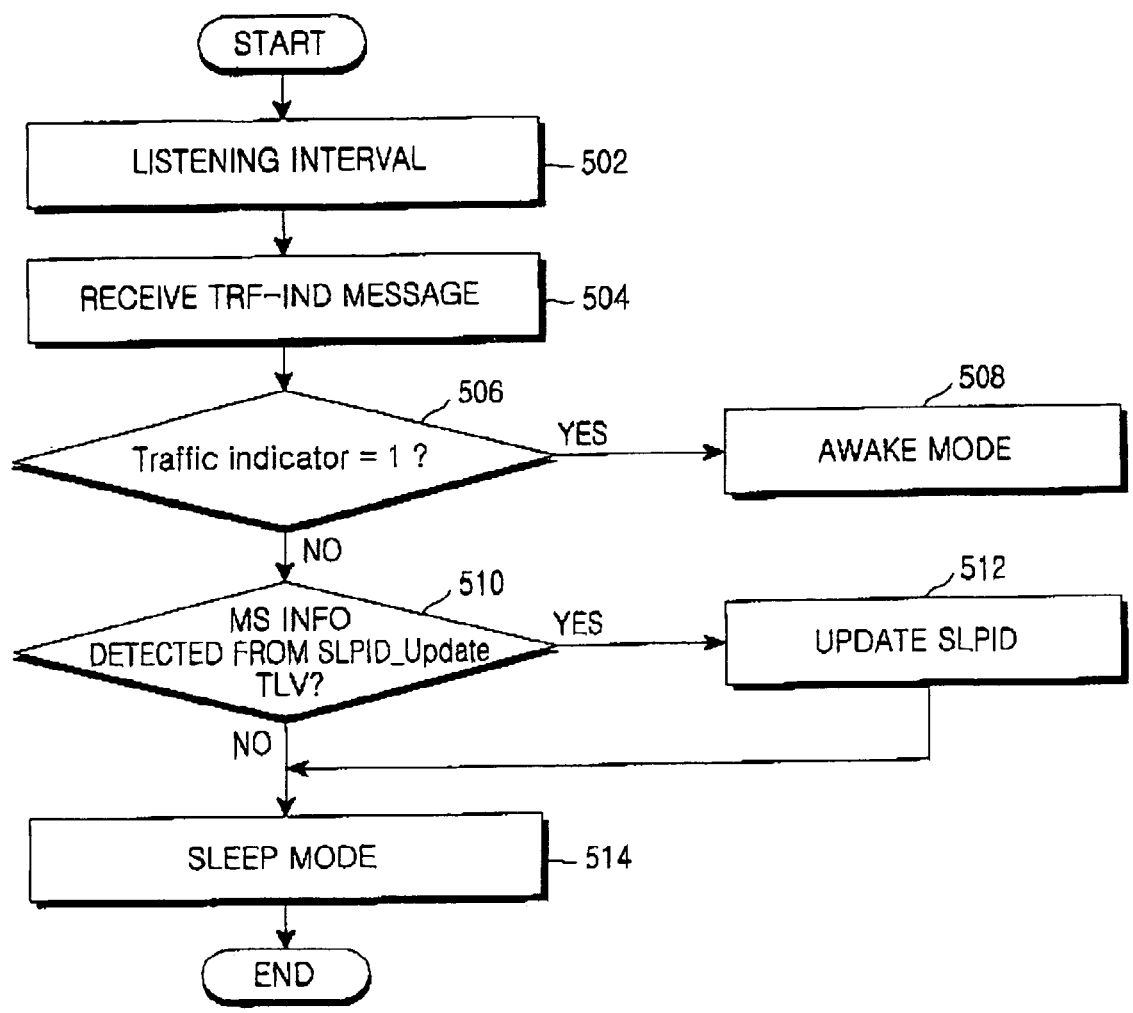

FIGS. 5A and 5B are flowcharts illustrating an MS operation of performing SLPID update through a TRF-IND message in a communication system according to an embodiment of the present invention. More specifically, FIG. 5A illustrates an exemplary MS operation for a 2-bit TRF-IND message, and FIG. 5B illustrates an exemplary MS operation for a 1-bit TRF-IND message. That is, FIGS. 5A and 5B illustrate an SLPID update operation of the MS in the case where an SLPID update indicator of the MS in a TRF-IND message received in a listening interval of the sleep mode is set to 1 in a communication system according to an embodiment of the present invention.

Referring to FIG. 5A, an MS in the sleep mode currently stays in the listening interval in step 501. For the listening interval, the MS receives a TRF-IND message shown in Table 5 in step 503.

The MS, after receiving the TRF-IND message for the listening interval, analyzes information on an SLPID bitmap of the received TRF-IND message. That is, the MS checks the presence/absence of data traffic transmitted thereto and the necessity to update an old SLPID allocated thereto, based on the SLPID bitmap information of the received TRF-IND message. More specifically, the MS checks a bit value corresponding to a traffic indicator therefor in the SLPID bitmap of the TRF-IND message in step 505.

If the traffic indicator value for the MS is set to 1, the MS enters the awake mode, recognizing the presence of data traffic to be transmitted thereto, and performs a traffic transmission/reception process with the BS in step 507. However, if the traffic indicator value is not set to 1, indicating the absence of data traffic to be transmitted to the MS, then the MS checks in step 509 if there is an SLPID to be newly allocated thereto, by analyzing an SLPID update indicator value of the TRF-IND message.

If the SLPID update indicator value is set to 1, the MS reads an SLPID_Update TLV included in the TRF-IND message received in step 503, and acquires information on an SLPID newly allocated thereto in step 511.

Because the SLPID_Update TLV occasionally includes SLPID information for more than one MS, the MS reads a value for the first 10 bits from an Old_New_SLPID of the SLPID_Update TLV to detect information being coincident with its current SLPID in step 511. As a result of the detection, if the MS detects an Old_New_SLPID being coincident with its current SLPID, the MS recognizes the last 10 bits of the Old_New_SLPID as an SLPID newly allocated thereto. Subsequently, the MS updates its own SLPID according to the SLPID allocated to the last 10 bits of the Old_New_SLPID.

In step 513, the MS enters the sleep mode after updating the SLPID.

If it is determined in step 509 that the SLPID update indicator value is not set to 1, the MS maintains its current SLPID and stays in the sleep mode, in step 513, recognizing the non-necessity to update the SLPID.

Referring to FIG. 5B, an exemplary MS operation for a 1-bit TRF-IND message received from a BS, because steps 502 through 508 of FIG. 5B are equal to the steps 501 through 507 in operation, a detailed description thereof will be omitted. However, FIG. 5B is different from FIG. 5A in that the TRF-IND message received from the BS has a 1-bit value. Therefore, the process of FIG. 5B is the same as that of FIG. 5A except that the TRF-IND message has a 1-bit value. As the received TRF-IND message has a 1-bit value, step 510 of FIG. 5B is different from step 509 of FIG. 5A in operation.

That is, if it is determined in step 506 that the traffic indicator value is not set to 1, indicating the absence of data traffic to be transmitted to the MS, the MS reads SLPID_Update information included in a TRF-IND message received from the BS in the form of TLV, and determines whether there is an SLPID newly allocated thereto, in step 510. If there is an SLPID newly allocated thereto in the SLPID_Update TLV, the MS updates its SLPID with the new SLPID in step 512.

Because the SLPID_Update TLV occasionally includes SLPID information for more than one MS, the MS reads a value for the first 10 bits from the Old_New_SLPID of the SLPID_Update TLV, and detects information matching its current SLPID. If the MS detects an Old_New_SLPID corresponding to its current SLPID, the MS updates the SLPID newly allocated thereto with the last 10 bits of the Old_New_SLPID, and then enters the sleep mode, in step 514. Upon failure to detect SLPID information corresponding to the MS, the MS remains in the sleep mode in step 514, thereby maintaining its current SLPID.

Third Embodiment

Figure 6:
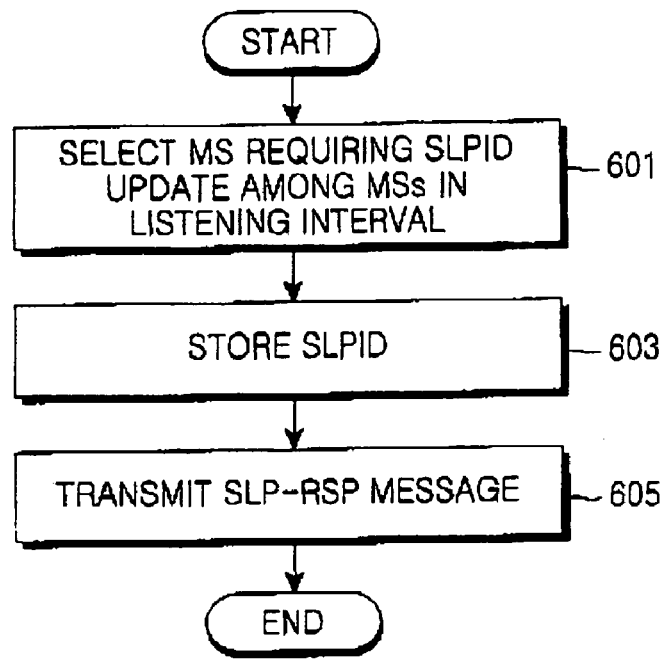
FIG. 6 is a flowchart illustrating an SLPID update process by a BS using an unsolicited SLP-RSP message in a communication system according to an embodiment of the present invention.
Figure 7:
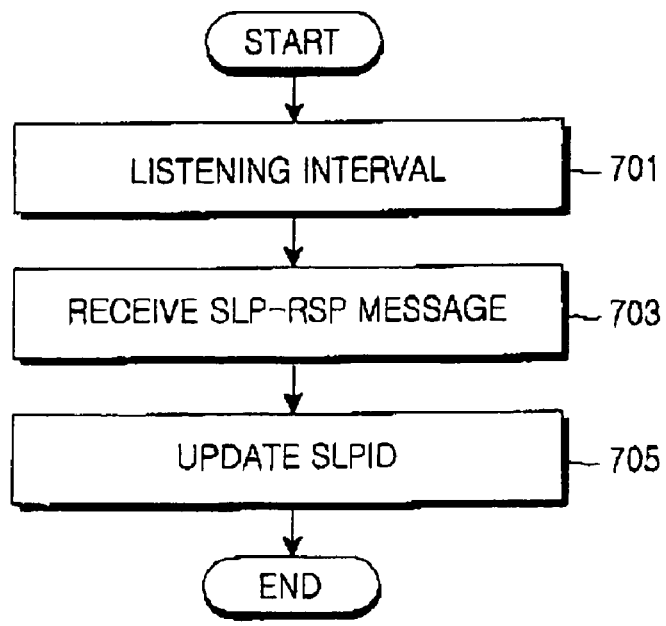
FIG. 7 is a flowchart illustrating an SLPID update process by an MS using an unsolicited SLP-RSP message in a communication system according to an embodiment of the present invention.

The SLPID update method according to the third embodiment of the present invention is characterized by updating an SLPID using an unsolicited SLP-RSP message in a listening interval of a sleep mode. With reference to FIGS. 6 and 7, a description will now be made of an SLPID update method using an unsolicited SLP-RSP message according to the third embodiment of the present invention.

FIG. 6 is a flowchart illustrating a BS operation of updating an SLPID of an MS using an unsolicited SLP-RSP message in a listening interval of a sleep mode in a communication system according to the third embodiment of the present invention. Referring to FIG. 6, a BS determines in step 601 whether there is a need for SLPID update for MSs staying in the listening interval of the sleep mode. It is assumed herein that the least SLPID number that the BS can allocate to an MS staying in a listening interval of the sleep mode is an SLPID#1. In this case, the process of determining in step 601 whether there is a need for SLPID update for MSs staying in the listening interval of the sleep mode is achieved in the following manner. The BS determines whether there is any unallocated SLPID, i.e., any empty SLPID, between an SLPID currently allocated to the MS in the listening interval of the sleep mode and the SLPID#1, and if there is an empty SLPID, the BS determines that there is a need to update an SLPID of the MS.

If it is determined in step 601 that there is a need for SLPID update for a particular MS, the BS determines, as an SLPID to be newly allocated to the MS, an SLPID with the least number among the unused empty SLPIDs between the SLPID allocated to the MS and the least SLPID allocable by the BS. In step 603, the BS sets a Sleep-Approved value in the SLP-RSP message to 1, defines interval information of the SLP-RSP message, i.e., Start Frame value, Initial-Sleep Window value, Final-Sleep Window value, and Listening Interval information, as interval information currently used by the MS, and stores the interval information together with the newly determined SLPID information in the SLP-RSP message.

In step 605, the BS transmits an SLP-RSP message including the SLPID newly allocated to the MS and the interval information, to the corresponding MS.

FIG. 7 is a flowchart illustrating an MS operation of performing SLPID update using an unsolicited SLP-RSP message in a listening interval of the sleep mode in a communication system according to an embodiment of the present invention. Referring to FIG. 7, an MS stays in a listening interval of the sleep mode in step 701, and receives an SLP-RSP message from a BS in step 703. Upon receiving the SLP-RSP message from the BS, the MS analyzes an SLPID included in the SLP-RSP message. If the MS detects the necessity to update the SLPID allocated thereto through the SLP-RSP message, the MS updates its own SLPID with the SLPID in the SLP-RSP message in step 705. The other interval information except for the SLPID is disregarded.

The SLP-RSP message used for instructing SLPID update as illustrated in FIGS. 6 and 7 includes the interval information for the sleep mode operation of the MS in addition to the SLPID information. The interval information is unnecessary for an MS in the sleep mode. Therefore, the present invention proposes a format of a new SLP-RSP message not including the unnecessary interval information. A format of the modified SLP-RSP message according to an embodiment of the present invention is shown below in Table 7.

TABLE 7

| Syntax | Size | Notes |
|---|---|---|
| MOB-SLP-RSP_Message_Format( ){ | | |
| Management message type = 51 | 8 bits | |
| Sleep-approved | 1 bit | 0: Sleep-mode request denied<br>1: Sleep-mode request approved |
| if(Sleep-approved==0) { | | |
| After-REQ-action | 1 bit | 0: The MS may retransmit the MOB-SLP-REQ message after the time duration (REQ-duration) given by the BS in this message.<br>1: The MS shall not retransmit the MOB-SLP-REQ message and shall await the MOB-SLP-RSP message from the BS |

TABLE 7-continued

| Syntax | Size | Notes |
|---|---|---|
| REQ-duration | 4 bits | Time duration for case where After-REQ-action value is 0. |
| reserved | 2 bits | |
| } | | |
| else { | | |
| SLPID_Update | 1 bit | 0: BS provides the information for sleep mode operation 1: BS informs Sleep ID update |
| if(SLPID_Update==0){ | | |
| Start frame | 6 bits | |
| initial-sleep window | 6 bits | |
| final-sleep window base | 10 bits | |
| listening interval | 4 bits | |
| final-sleep window exponent | 3 bits | |
| SLPID | 10 bits | |
| reserved | 7 bits | |
| } | | |
| else{ | | |
| SLPID | 10 bits | |
| reserved | 4 bits | |
| } | | |
| } | | |
| } | | |

As shown in Table 7, the proposed SLP-RSP message includes an SLPID_Update field used for determining whether the SLP-RSP message is a message transmitted for an SLPID update operation or a message transmitted to indicate SLPID and interval information to be used in the sleep mode operation performed when starting the existing sleep mode operation. For a SLP-RSP message transmitted to start the sleep mode operation of the MS, the BS sets the SLPID_Update field value to 0, and stores start time of the sleep mode operation, initial-window size, final-window size, listening interval, and SLPID information. When there is a need to update an SLPID of the MS during a sleep mode operation with the MS, i.e., when the SLP-RSP message is a message transmitted to inform the MS of a new SLPID, the BS sets the SLPID_Update field value to 1 and stores information on only an SLPID to be newly allocated.

The SLP-RSP message shown in Table 7 can be created such that it includes interval information necessary for the sleep mode operation in addition to the SLPID in the form of TLV of the SLP-RSP message. In this case, when the MS and the BS perform a sleep mode entry negotiation process using the modified SLP-RSP message, the SLP-RSP message can be created such that it includes Interval_Info TLV, i.e., start time of the sleep mode operation, initial-window size, final-window size, and listening interval.

Therefore, when the SLP-RSP message is use used to give instructions to update an SLPID of the MS, the BS performs an SLPID update operation by transmitting the SLP-RSP message without the interval information such as the Interval_Info TLV to the MS. When the SLP-RSP message is used to give instructions to perform a sleep mode operation, the BS transmits the SLP-RSP message with the interval information such as the Interval_Info TLV to the MS.

Fourth Embodiment

Figure 8:
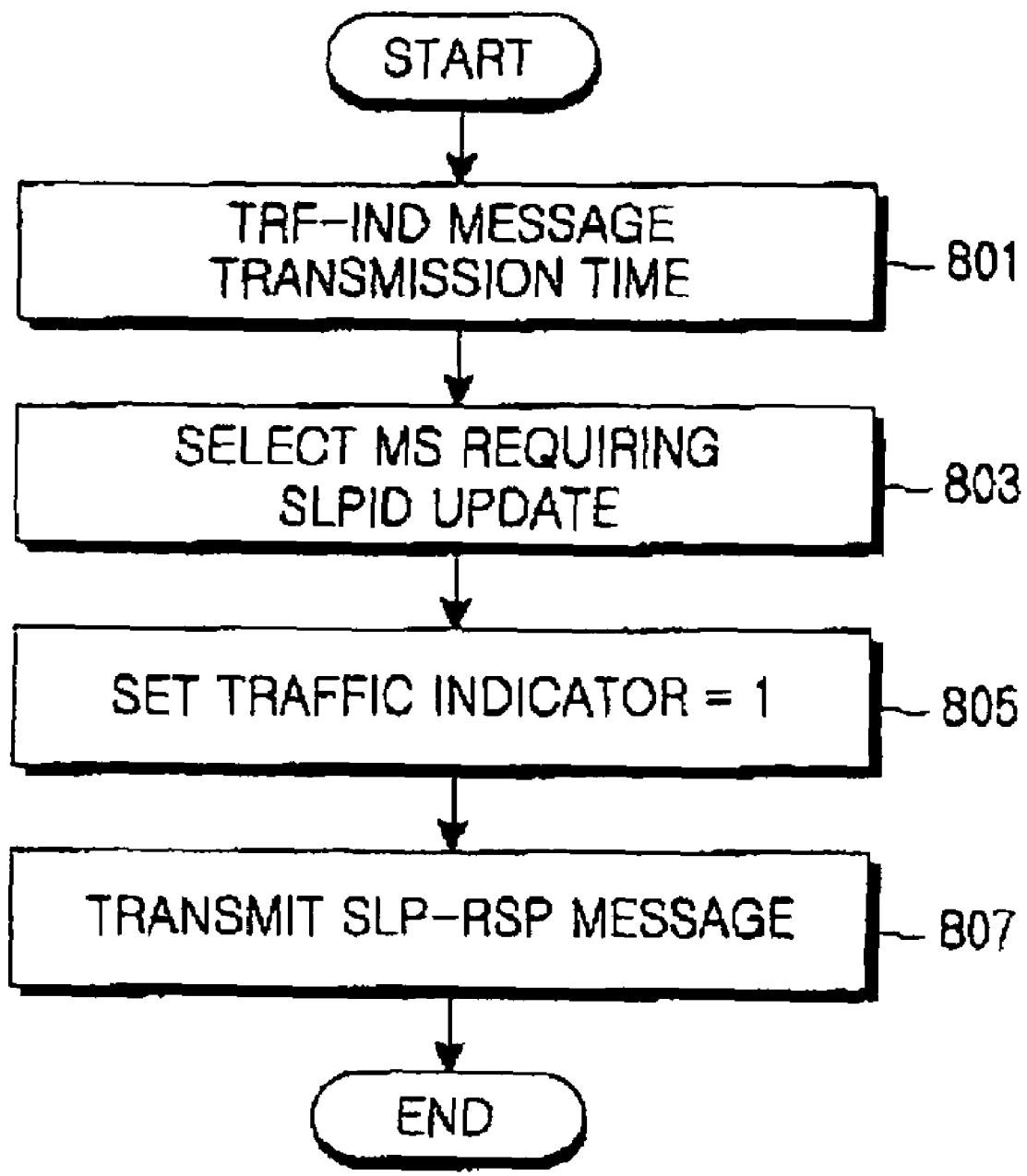
FIG. 8 is a flowchart illustrating an SLPID update process by a BS using an unsolicited SLP-RSP message in a communication system according to another embodiment of the present invention.

FIG. 8 is a flowchart illustrating a BS operation for updating an SLPID of an MS using a modified SLP-RSP message in a listening interval of a sleep mode in a communication system according to another embodiment of the present invention. Referring to FIG. 8, if it is time to transmit a TRF-IND message (step 801), a BS selects an MS not requiring to enter the awake mode among the MSs in the listening interval of the sleep mode, i.e., selects an MS not requiring to perform SLPID update among the MSs having no traffic to transmit, in step 803. The process of determining the necessity to update the SLPID has been described above.

Next, the BS must enable the MS in the sleep mode to transition to the awake mode in order to send a SLP-RSP message for SLPID update to the MS. Therefore, the BS sets a traffic indicator corresponding to the MS in the SLPID bitmap of the TRF-IND message to 1 in step 805. Thereafter, in step 807, the BS sets a Sleep-Approved field value of the SLP-RSP message to 1 in order to inform the MS of the SLPID update, and transmits the SLP-RSP message with the newly allocated SLPID information stored therein, to the MS.

Figure 9:
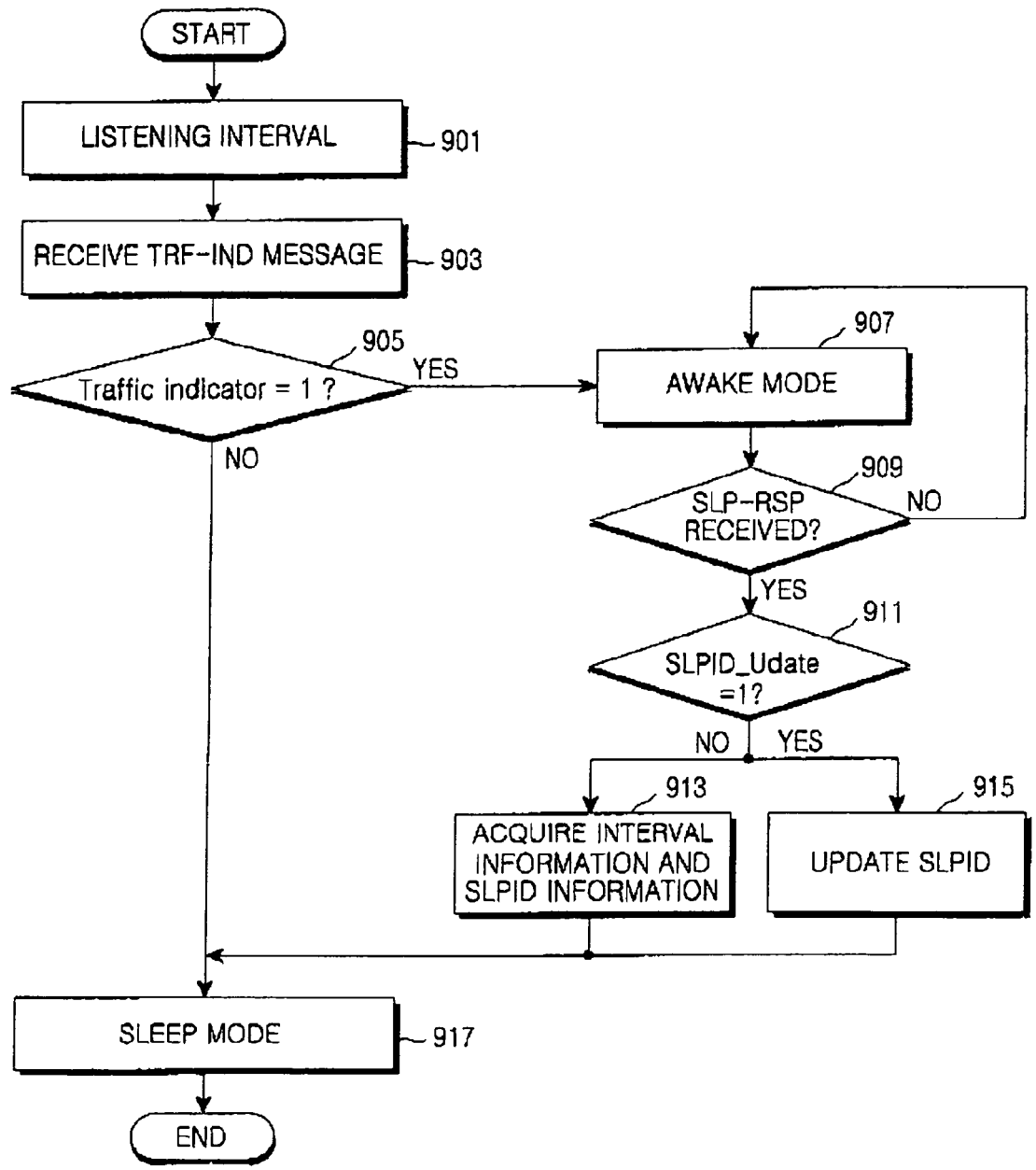
FIG. 9 is a flowchart illustrating an SLPID update process by an MS using an unsolicited SLP-RSP message in a communication system according to another embodiment of the present invention.

FIG. 9 is a flowchart illustrating an MS operation of performing SLPID update by receiving a modified SLP-RSP message in a listening interval of the sleep mode in a communication system according to an embodiment of the present invention. Referring to FIG. 9, an MS staying in a listening interval of the sleep mode (step 901) receives a TRF-IND message from a BS in step 903. In step 905, the MS checks the TRF-IND message received from the BS to determine if its own traffic indicator is set to 1. If its traffic indicator is not set to 1, i.e., is set to a negative indicator, the MS enters the sleep mode, recognizing the absence of data traffic to be transmitted thereto, in step 917. However, if its traffic indicator in the TRF-IND message is set to 1, i.e., is set to a positive indicator, the MS transitions to the awake mode to temporarily wake up from the sleep mode, recognizing the presence of data traffic to be transmitted thereto, in step 907.

Upon receiving an SLP-RSP message from the BS in the awake mode in step 909, the MS checks a bit value of an SLPID_Update field of the SLP-RSP message in step 911. If no SLP-RSP message is received from the BS in the awake mode, the MS waits for the reception of transmission data traffic in the awake mode.

If the SLPID_Update field is set to 1, the MS updates its current SLPID with a new SLPID included in the SLP-RSP message in step 915, recognizing the necessity to update its own SLPID. Subsequently, in step 917, the MS enters the sleep mode after the SLPID update.

However, if it is determined in step 911 that the SLPID_Update field is not set to 1, the MS acquires interval information necessary for the sleep mode operation and information on an SLPID allocated thereto in step 913, recognizing a new start of the sleep mode operation. Thereafter, in step 917, the MS enters the sleep mode.

As described above, the novel BWA communication system can update an SLPID allocated to an MS in a sleep mode. As the communication system supporting the sleep mode can update an SLPID allocated to the MS in the sleep mode, it can reduce a size of an SLPID bitmap, contributing to a reduction in the processing time required for reading and processing the SLPID bitmap. That is, the communication system enables an SLPID allocated to the MS in the sleep mode to be updated even in the sleep mode rather than being fixed, reducing the number of SLPID bitmaps to be processed by the MS in the sleep mode state. As a result, the novel process of processing a TRF-IND message by the MS in the sleep mode is more effective than the conventional process.

While the present invention has been shown and described with reference to certain exemplary embodiments thereof, it will be understood by those skilled in the art that various changes in form and details may be made therein without departing from the spirit and scope of the present invention as defined by the appended claims.

What is claimed is:

1. A method for updating a sleep identifier (SLPID) by a base station (BS) in a broadband wireless access (BWA) communication system, the method comprising the steps of:
transmitting a message including SLPID update information to a mobile station (MS) in a sleep mode,
wherein the SLPID update information includes information on an old SLPID allocated to the MS and a new SLPID allocated to the MS for updating the old SLPID, and an SLPID is uniquely assigned by the BS whenever an MS is instructed to enter a sleep mode.

2. The method of claim 1, wherein the SLPID update information includes M bits, the first M/2 bits among M bits indicate the old SLPID, the last M/2 bits among M bits indicate the new SLPID, and M is an integer greater than 2.

3. The method of claim 2, wherein the message is a ranging response (RNG-RSP) message.

4. The method of claim 1, wherein the new SLPID is one of other SLPIDs different from the old SLPID, the other SLPIDs are empty SLPIDs, each of the empty SLPIDs is an SLPID returned to the BS, which was previously allocated to other MSs.

5. A system for updating a sleep identifier (SLPID) in a broadband wireless access (BWA) communication system, the system comprising:
a mobile station (MS) in a sleep mode;
a base station (BS) for transmitting a message including SLPID update information to the MS,
wherein the SLPID update information includes information on an old SLPID allocated to the MS and a new SLPID allocated to the MS for updating the old SLPID, and an SLPID is uniquely assigned by the BS whenever an MS is instructed to enter a sleep mode.

6. The system of claim 5, wherein the SLPID update information includes M bits, the first M/2 bits among M bits indicate the old SLPID, the last M/2 bits among M bits indicate the new SLPID, and M is an integer greater than 2.

7. The system of claim 6, wherein the message is a ranging response (RNG-RSP) message.

8. The system of claim 5, wherein the new SLPID is one of other SLPIDs different from the old SLPID, the other SLPIDs are empty SLPIDs, each of the empty SLPIDs is an SLPID, returned to the BS, which was previously allocated to other MSs.

9. A method for updating a sleep identifier (SLPID), by a mobile station (MS) in a sleep mode, in a broadband wireless access (BWA) communication system, the method comprising the steps of:
receiving, from a base station (BS), a message including, SLPID update information including information on an old SLPID allocated to the MS and a new SLPID allocated to the MS for updating the old SLPID; and
updating the old SLPID to the new SLPID,
wherein an SLPID is uniquely assigned by the BS whenever an MS is instructed to enter a sleep mode.

10. The method of claim 9, wherein the SLPID update information includes M bits, the first M/2 bits among M bits indicate the old SLPID, the last M/2 bits among M bits indicate the new SLPID, and M is an integer greater than 2.

11. The method of claim 10, wherein the message is a ranging response (RNG-RSP) message.

12. The method of claim 9, wherein the new SLPID is one of other SLPIDs different from the old SLPID, the other SLPIDs are empty SLPIDs, each of the empty SLPIDs is an SLPID, returned to the BS, which was previously allocated to other MSs.

13. A system for updating a sleep identifier (SLPID) in a broadband wireless access (BWA) communication system, the system comprising:
a base station (BS); and
a mobile station (MS) for,
receiving, from the BS, a message including SLPID update information including information on an old SLPID allocated to the MS and a new SLPID allocated to the MS for updating the old SLPID, and updating the old SLPID to the new SLPID,
wherein the MS is in a sleep mode, and an SLPID is uniquely assigned by the BS whenever an MS is instructed to enter a sleep mode.

14. The system of claim 13, wherein the SLPID update information includes M bits, the first M/2 bits among M bits indicate the old SLPID, the last M/2 bits among M bits indicate the new SLPID, and M is an integer greater than 2.

15. The system of claim 14, wherein the message is a ranging response (RNG-SP) message.

16. The system of claim 13, wherein the new SLPID is one of other SLPIDs different from the old SLPID, the other SLPIDs are empty SLPIDs, each of the empty SLPIDs is an SLPID, returned to the BS, which was previously allocated to other MSs.

* * * * *